US012233292B2

(12) United States Patent
Facer et al.

(10) Patent No.: US 12,233,292 B2
(45) Date of Patent: *Feb. 25, 2025

(54) ANTI-FOG RESPIRATOR

(71) Applicant: 3M INNOVATIVE PROPERTIES COMPANY, St. Paul, MN (US)

(72) Inventors: John M. Facer, Langley Park (GB); Audra A. Wilson, Gateshead (GB); Christopher P. Henderson, High Shincliffe (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,443

(22) Filed: Jul. 21, 2023

(65) Prior Publication Data

US 2023/0356011 A1 Nov. 9, 2023

Related U.S. Application Data

(63) Continuation of application No. 17/356,008, filed on Jun. 23, 2021, now Pat. No. 11,904,191, which is a continuation of application No. 15/682,781, filed on Aug. 22, 2017, now Pat. No. 11,135,460, which is a continuation of application No. 11/743,716, filed on May 3, 2007, now Pat. No. 9,770,611.

(51) Int. Cl.

| | |
|---|---|
| *A62B 23/02* | (2006.01) |
| *A41D 13/11* | (2006.01) |
| *A62B 18/02* | (2006.01) |

(52) U.S. Cl.

CPC ............ *A62B 23/025* (2013.01); *A41D 13/11* (2013.01); *A62B 18/025* (2013.01); *A41D 13/1115* (2013.01); *A41D 13/1161* (2013.01)

(58) Field of Classification Search

CPC ........ A41D 13/11–113; A41D 13/1184; A62B 18/025; A62B 23/025

See application file for complete search history.

(56) References Cited

U.S. PATENT DOCUMENTS

| | | | | | |
|---|---|---|---|---|---|
| 5,656,368 | A * | 8/1997 | Braun | B32B 3/28 | 210/493.1 |
| 5,701,893 | A * | 12/1997 | Kern | A62B 23/025 | 128/206.19 |
| 5,724,964 | A * | 3/1998 | Brunson | A61F 9/029 | 128/206.25 |

* cited by examiner

*Primary Examiner* — Valerie L Woodward

(57) ABSTRACT

A respirator that includes a harness and a mask body that is air permeable. The mask body has a sinus region and a primary filtering region and comprises at least one nonwoven fibrous webs The sinus region of the mask body exhibits a resistance to airflow that is greater than the primary filtering region. This resistance to airflow is achieved through an alteration of the intrinsic structure of the plurality of nonwoven fibrous layers in the sinus region without adding additional material to the mask body. The alteration of the intrinsic structure assists in preventing eyewear fogging.

20 Claims, 6 Drawing Sheets

ANTI-FOG RESPIRATOR

The present invention pertains to a respirator that has an anti-fog feature intrinsically built-in to the sinus region of the mask body.

BACKGROUND

Maintenance-free respirators (sometimes referred to as "filtering face masks" or "filtering face pieces") are commonly worn over the breathing passages of a person to prevent impurities or contaminants from being inhaled by the wearer. Maintenance-free respirators typically comprise a mask body and a harness and have the filter material incorporated into the mask body itself—as opposed to having attachable filter cartridges or insert molded filter elements (see e.g., U.S. Pat. No. 4,790,306 to Braun)—to remove the contaminants from the ambient air.

To ensure that contaminants do not inadvertently enter the mask interior without passing through the filter media, maintenance-free respirators have been designed to fit snugly upon the wearer's face. Conventional maintenance-free respirators can, for the most part, match the contour of a person's face over the cheeks and chin. In the nose region, however, there is a complex contour change, which makes a snug fit more challenging to achieve. Failure to achieve a snug fit can allow air to enter or exit the respirator interior without passing through the filter media. In this situation, contaminants may enter the wearer's breathing track, and other persons or things may be exposed to contaminants exhaled by the wearer. Further, the wearer's eyewear can become fogged, which, of course, makes visibility more troublesome to the wearer and creates further unsafe conditions for the user and others.

Nose clips are commonly used on maintenance-free respirators to prevent fogging of a wearer's eyewear. Conventional nose clips are in the form of malleable, linear, strips of aluminum—see, for example, U.S. Pat. Nos. 5,307,796, 4,600,002, 3,603,315; see also U.K. Patent Application GB 2,103,491 A. More recent products use an "M" shaped band of malleable metal to improve fit in the nose area—see U.S. Pat. No. 5,558,089 and Des. 412,573 to Castiglione—or spring loaded and deformable plastics—see U.S. Patent Publication 2007/0044803A1 and application Ser. No. 11/236,283. Nose foams are also regularly used on the top section of the mask to improve fit and to prevent eyewear fogging—see U.S. patent application Ser. Nos. 11/553,082 and 11/459,949. Although nose clips and nose foams may assist in providing a snug fit over the wearer's nose to preclude eyewear fogging problems, the risk still exists that the wearer's eyewear could become fogged from air that leaves the mask interior through the mask body. That is, the eyewear may become fogged—even though the mask properly fits the wearer's face in the nose region—by warm, moist exhaled air that is forced through the mask body in the sinus region.

Persons skilled in the art of developing maintenance-free respirators have therefore taken other measures to preclude eyewear fogging caused by air that is rightfully purged from the mask interior through the mask body. Examples of some of these developments are disclosed in the following Japanese patents publications: 2005-13492, 92-39050, 2003-236000, 2001-161843, 2001-204833, 2003-236000, 2005-13492, 2001-161843, Hei 9-239050, and in U.S. Pat. No. 6,520,181. In these developments—like the nose clip and nose foam features cited above—an additional item is added to the sinus region of the mask body to prevent exhaled air from passing through this portion of the respirator. Although the prior art has addressed the need for precluding eyewear fogging, it has not done so in a manner that uses existing mask body components to address the problem.

SUMMARY OF THE INVENTION

The present invention provides a new maintenance-free respirator that comprises: (a) a harness; and (b) a mask body that includes a sinus region and a primary filtering region and that comprises at least one nonwoven fibrous web. The nonwoven fibrous web includes a filtration layer, and the sinus region of the mask body has an alteration to its intrinsic structure to significantly increase the pressure drop across it. The increase in pressure drop is achieved through an alteration to the intrinsic structure of the nonwoven fibrous web without adding additional material or items to the mask body in the sinus region.

The present invention differs from conventional maintenance-free respirators in that it relies on an alteration of the intrinsic structure of at least one of the nonwoven fibrous layers in the sinus region of the mask body rather than add-on additional material or items to the mask body in this region to accomplish an anti-fog objective. The inventors discovered that by altering the intrinsic structure of the mask body in the sinus region that increased resistance to airflow can occur, which encourages the air to exit the mask body through the primary filtering region rather than through the sinus region. When the exhaled air exits the mask through the primary filtering region, there is less opportunity for the wearer's eyewear to become fogged.

These and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

Glossary

In this document, the following terms will have the definitions as noted:

- "altering the intrinsic structure" means changing the essential nature or configuration of the arrangement and/or interrelation of the parts, e.g., the webs, fibers, filaments, or strands in the mask body, from one form to another but excluding such changes as they relate to joining various layer(s) of the mask body together at its perimeter, or otherwise altering the layer(s), to accommodate the attachment of an exhalation valve, nose foam, or harness;
- "central panel" means a panel that is located between the upper and lower panels;
- "central plane" means a plane that bisects the mask normally to its crosswise dimension;
- "clean air" means a volume of atmospheric ambient air that has been filtered to remove contaminants;
- "comprises (or comprising)" means its definition as is standard in patent terminology, being an open-ended term that is generally synonymous with "includes", "having", or "containing". Although "comprises", "includes", "having", and "containing" and variations thereof are commonly-used, open-ended terms, this invention also may be suitably described using narrower terms such as "consists essentially of", which is semi open-ended term in that it excludes only those things or elements that would have a deleterious effect on the performance of the inventive maintenance-free respirator in serving its intended function;

"contaminants" means particles (including dusts, mists, and fumes) and/or other substances that generally may not be considered to be particles (e.g., organic vapors, et cetera) but which may be suspended in air, including air in an exhale flow stream;

"crosswise dimension" is the dimension that extends across a wearer's nose when the respirator is worn;

"eye region" means the portion that resides beneath each eye of the wearer when the respirator is donned;

"filtration layer" means one or more layers of material, which layer(s) is adapted for the primary purpose of removing contaminants (such as particles) from an air stream that passes through it;

"harness" means a structure or combination of parts that assists in supporting the mask body on a wearer's face;

"integral" means that it is part of the whole such that it is not a separate piece that is attached thereto;

"items" means an article or unit;

"line of demarcation" means a fold, seam, weld line, bond line, stitch line, hinge line, and/or any combination thereof;

"lower panel" means the panel that extends under or makes contact with a wearer's chin when the respirator is being worn by a person;

"mask body" means an air-permeable structure that can fit at least over the nose and mouth of a person and that helps define an interior gas space separated from an exterior gas space;

"material" means a substance or thing;

"nonwoven fibrous web" means fibers that are not woven together but nonetheless may be handable together as a mass;

"nose clip" means a mechanical device (other than a nose foam), which device is adapted for use on a mask body to improve the seal at least around a wearer's nose;

"nose foam" means a foam-like material that is adapted for placement on the interior of a mask body to improve fit and/or wearer comfort over the nose when the respirator is worn;

"nose region" means the portion that resides over a person's nose when the respirator is worn;

"perimeter" means the edge of the mask body;

"polymer" means a material that contains repeating chemical units, regularly or irregularly arranged;

"polymeric" and "plastic" each mean a material that mainly includes one or more polymers and may contain other ingredients as well;

"primary filtering region" means the portion of the mask body that exhibits a lower pressure drop and that contains a filtration layer;

"respirator" means a device that is worn by a person to filter air before the air enters the person's respiratory system;

"significantly increase" means the increase is measurable and is beyond measurement error;

"sinus region" means the nose region and parts the area of the mask body that reside beneath the wearer's eyes and/or eye orbitals when the respirator is being worn and is described below in further detail in reference to FIGS. 1, 4, and 5; and "upper panel" means the panel that extends over the nose region and under the wearer's eyes when the respirator is worn.

DETAILED DESCRIPTION OF THE PREFERRED EMBODIMENTS

In practicing the present invention, improvements in respirator construction are provided which are beneficial to preventing the fogging of a respirator wearer's eyeglasses. The new inventive maintenance-free respirator includes a mask body that is adapted to fit over a person's nose and mouth. In the sinus region of the mask body, the intrinsic structure of the various layer(s) are altered to significantly increase the pressure drop. The pressure drop increase in the sinus region encourages the exhalate to exit the interior gas space through other regions of the mask body. Because the exhaled air has less tendency to pass through the sinus region, there may be a concomitant reduction in condensed exhalate forming on the eyewear.

Figure 1:
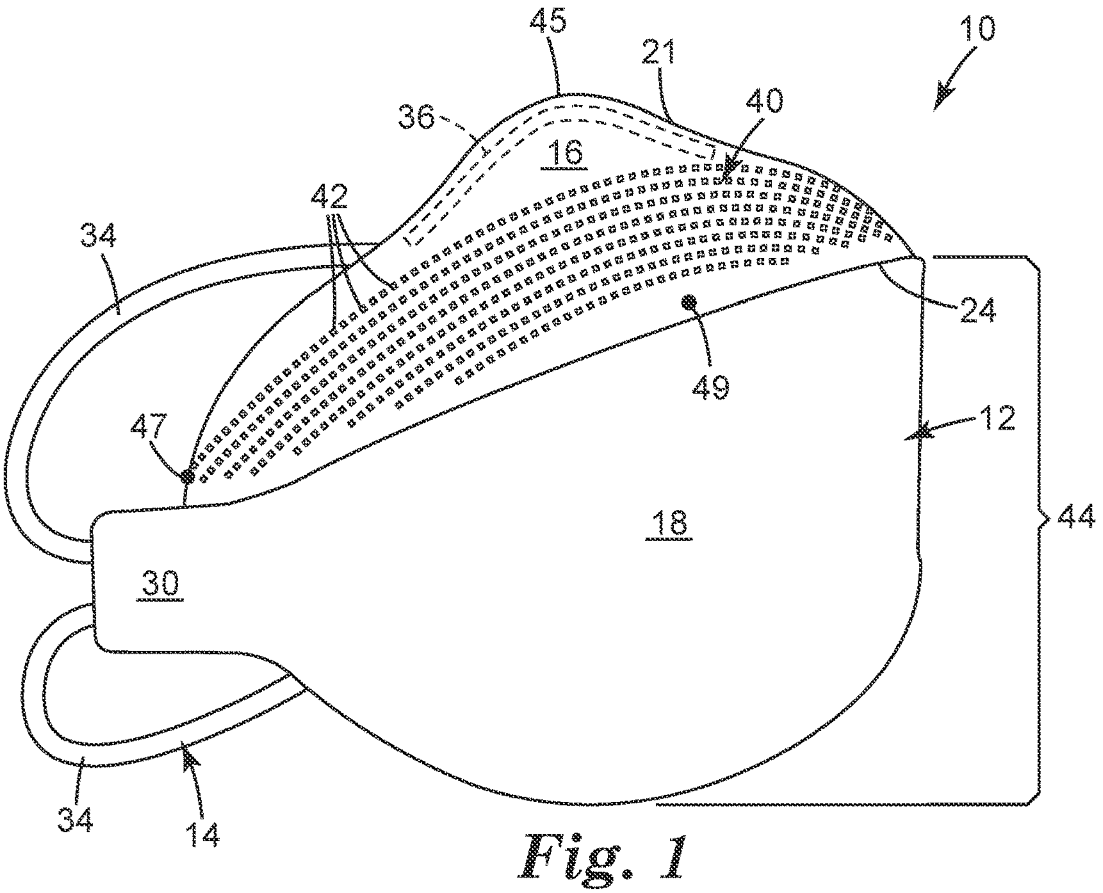
FIG. 1 is a perspective view of a maintenance-free respirator 10 in accordance with the present invention.
Figure 2:
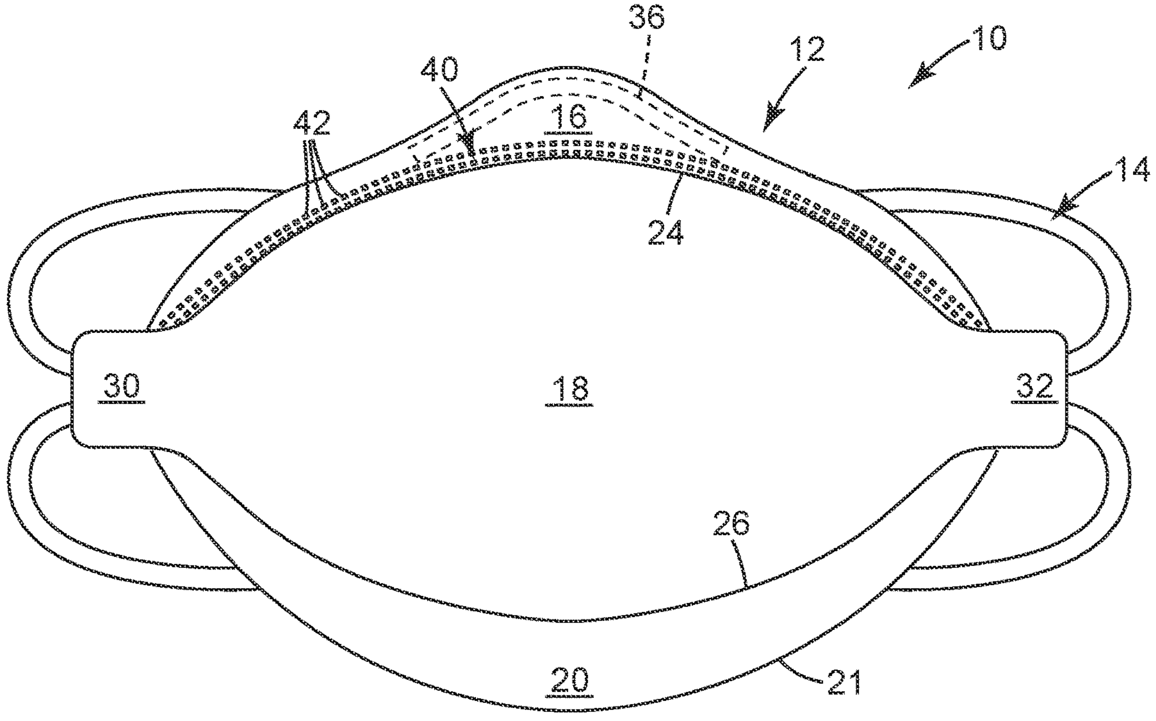
FIG. 2 is a front view of the maintenance-free respirator 10 in accordance with the present invention.

FIGS. 1 and 2 illustrate an example of a flat-fold respirator 10 that includes a mask body 12 and a harness 14. The mask body 12 comprises a plurality of panels, including an upper panel 16, a central panel 18, and a lower panel 20. The mask body 12 is adapted to engage the wearer's face at a face-contacting perimeter 21. Typically, the various layers that may comprise the mask body 12 are joined together at the perimeter 21 by welding, bonding, an adhesive, stitching, or any other suitable means.

Figure 3:
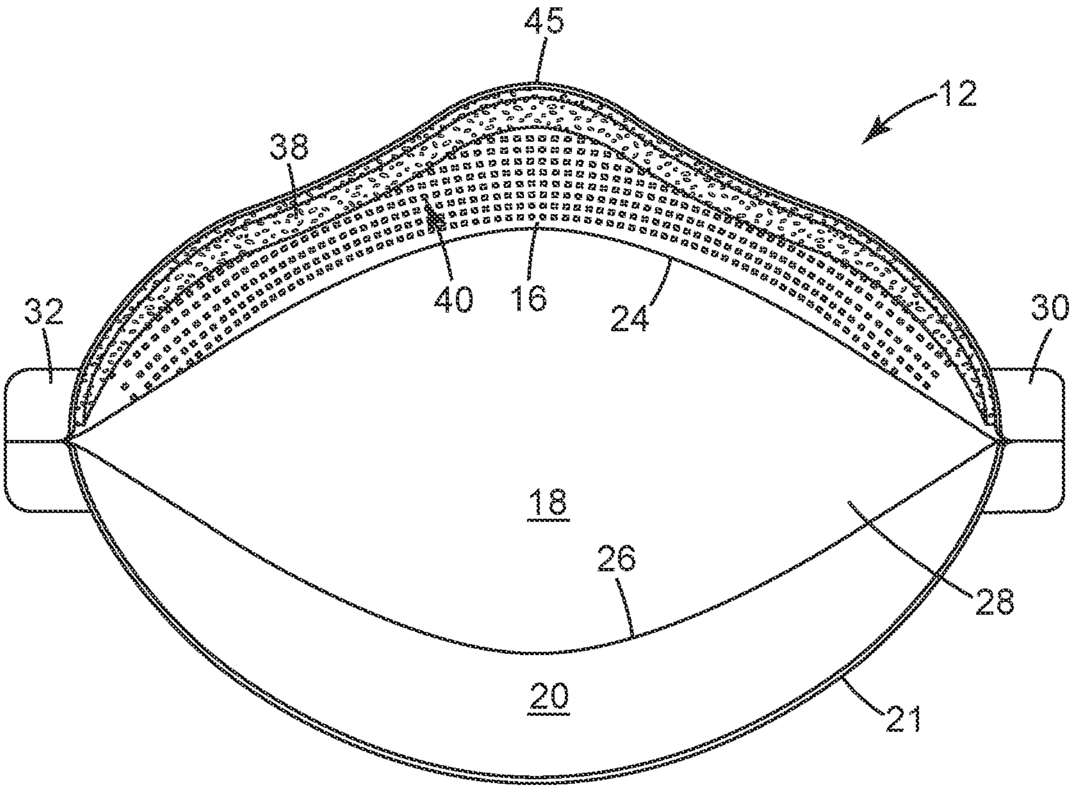
FIG. 3 is a rear view of a mask body 12 in accordance with the present invention.
Figure 4:
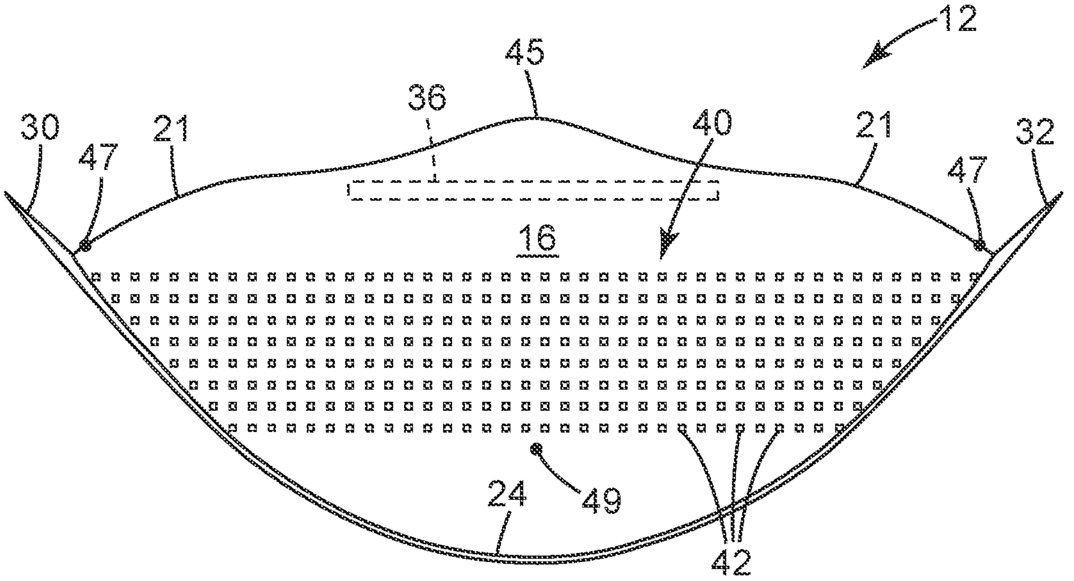
FIG. 4 is a top view of the mask body 12 in accordance with the present invention.
Figure 5:
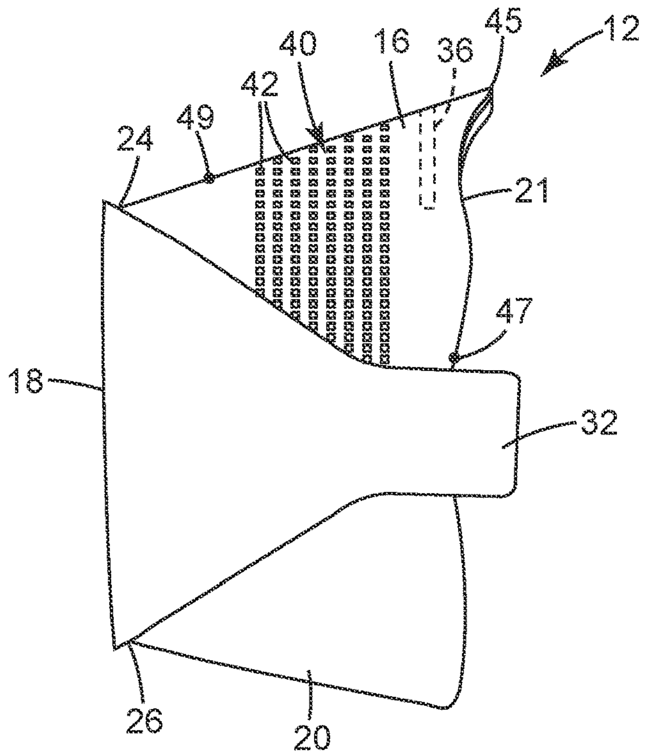
FIG. 5 is a right side view of the mask body 12 in accordance with the present invention.
Figure 6:
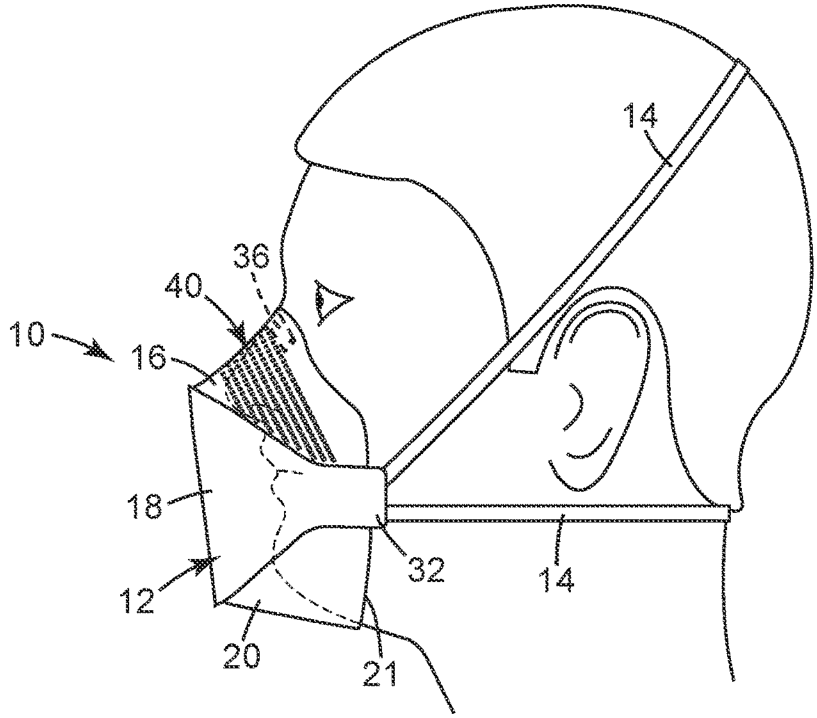
FIG. 6 is a side view of the maintenance-free respirator 10, in accordance with the present invention, shown on a person's face.
Figure 7:
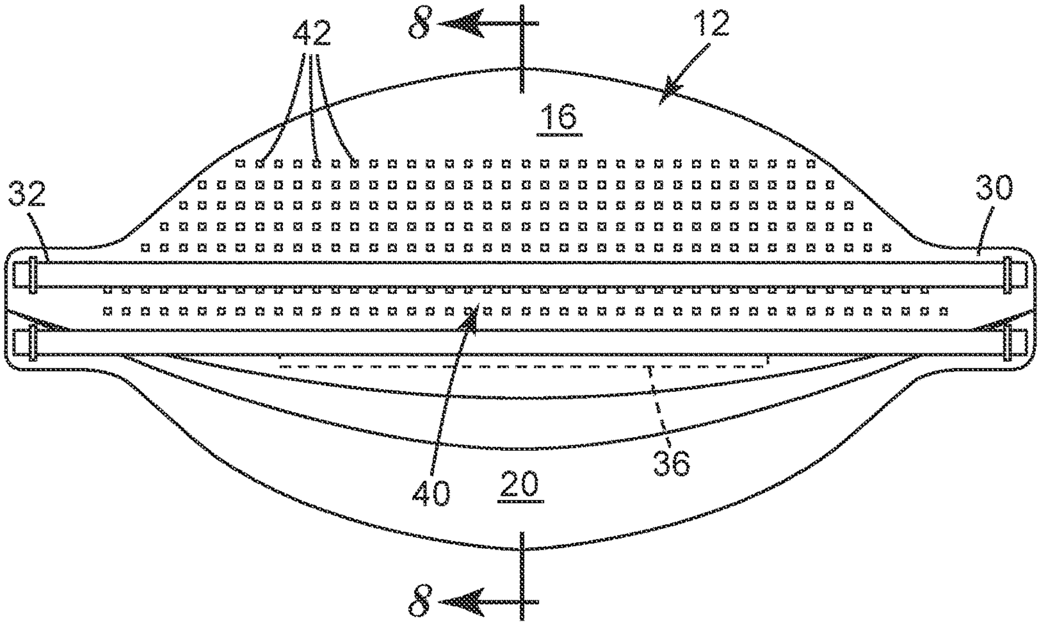
FIG. 7 is a rear view of the maintenance-free respirator 10, in accordance with the present invention, shown in a folded condition.

FIGS. 3-5 particularly show the mask body 12 and its multi-paneled construction. The central panel 18 is separated from the upper panel 16 and the lower panel 20 by first and second lines of demarcation 24 and 26. The upper and lower panels 16 and 20 may each be folded inward towards the backside or inner surface 28 of the central panel 18 when the mask is being folded flat for storage and may be opened outward for placement on a wearer's face (FIG. 6). When the mask body 12 is taken from its open configuration to its closed configuration or vice versa, the upper and lower panels 16 and 20, rotate respectively about the first and second lines of demarcation 24 and 26. In this sense, the first and second lines of demarcation 24 and 26 act as first and second hinges or axis, respectively, for the upper and lower panels 16 and 20. The mask body 12 also may be provided with first and second tabs 30 and 32 that provide a region for securement of the harness 14, which may include straps or elastic bands 34. An example of such a tab is shown in U.S. Pat. D449,377 to Henderson et al. The straps or bands 34 are stapled, welded, adhered, or otherwise secured to the mask body 12 at each opposing side tab 30, 32 to hold the mask body 12 against the face of the wearer when the mask is being worn. An example of a compression element that could be used to fasten a harness to a mask body using ultrasonic welding is described in U.S. Pat. Nos. 6,729,332 and 6,705,317 to Castiglione. The band also could be welded directly to the mask body without using a separate attachment element—see U.S. Pat. No. 6,332,465 to Xue et al. Examples of other harnesses that could possibly be used are described in U.S. Pat. No. 5,394,568 to Brostrom et al. and U.S. Pat. No. 5,237,986 to Seppala et al. and in EP 608684A to Brostrom et al. The upper panel 16 also may include a nose clip 36 that may include a malleable strip of metal such as aluminum, which can be conformed by mere finger pressure to adapt the respirator to the configuration of the wearer's face in the nose region. An example of a suitable nose clip 36 is shown and described in U.S. Pat. No. 5,558,089 and Des. 412,573 to Castiglione. Other examples are shown in US Patent Publication 2007/0044803A1 and application Ser. No. 11/236,283. To improve fit over the nose and beneath the eyes, the mask body can be sculpted along the perimeter on the upper panel as described U.S. Pat. No. 10,827,787 entitled Maintenance free Respirator that has Concave Portions on Opposing Sides of Mask Top Section, which claimed priority to U.S. patent application Ser. No. 11/743,734 and was filed on the same day as the priority application for the present document. As shown in FIG. 3, the respirator 10 also may include a nose foam 38 that is disposed inwardly long the inside perimeter of the upper panel 16. The nose foam 38 also could extend around the whole perimeter of the mask body and could include a thermochromic fit-indicating material that contacts the wearer's face when the mask is worn. Heat from the facial contact causes the thermochromic material to change color to allow the wearer to determine if a proper fit has been established—see U.S. Pat. No. 5,617,749 to Springett et al. Examples of suitable nose foams are shown in U.S. patent application Ser. Nos. 11/553,082 and 11/459,949. The mask body 11 forms an enclosed space around the nose and mouth of the wearer and can take on a curved, projected shape that resides in spaced relation to a wearer's face. Flat-fold, maintenance-free respirators of the present invention can be manufactured according to the process described in U.S. Pat. Nos. 6,123,077, 6,484,722, 6,536,434, 6,568,392, 6,715,489, 6,722,366, 6,886,563, 7,069,930, and US Patent Publication No. US2006/0180152A1 and EP0814871B1 to Bostock et al. The flat-fold maintenance-free respirator of the invention also can include one or more tabs that may assist in opening the mask body from its folded condition—see US Patent Publ. 2008/0271740, entitled Maintenance Free Flat-Fold Respirator That Includes A Graspable Tab., filed May 3, 2007.

Although the mask body shown in the figures is a flat-fold, maintenance-free type, the maintenance-free respirator also could use a molded mask body or could come in a variety of other shapes and configurations. Examples of other mask body shapes are shown in U.S. Pat. No. 5,307,796 to Kronzer et al., D448,472 and D443,927 to Chen, RE37,974 to Bowers, and U.S. Pat. No. 4,827,924 to Japuntich. Molded mask bodies are described in U.S. Pat. No. 7,131,442 to Kronzer et al., U.S. Pat. No. 6,827,764 to Springett et al., U.S. Pat. No. 6,923,182 to Angadjivand et al., U.S. Pat. No. 4,850,347 to Skov, U.S. Pat. No. 4,807,619 to Dyrud et al., and U.S. Pat. No. 4,536,440 to Berg. Molded mask bodies commonly include a molded shaping layer for supporting the filtration layer.

FIGS. 1-7 each illustrate a sinus region 40 located on upper panel 16. As shown, the upper panel 16 has had its intrinsic structure altered in the sinus region 40. The alteration of the intrinsic structure may be achieved by, for example, bonding or welding the mask body structure. In one embodiment, an intended pattern of spot welds 42 may be placed in and throughout the sinus region 40. The spot welds 42 may extend through the various layer(s) that comprise the upper panel 16. That is, the welds may cause the individual layer(s) and fibers that comprise the upper panel 16 to become fused together. At the points were the individual layer(s) and fibers are fused together, there is less opportunity for air to pass through the nonwoven fibrous webs and/or other material that comprises the mask body 12. As a result of this alteration to the intrinsic structure, the pressure drop in a sinus region 40 of the mask body 12 increases, and preferably becomes greater than the pressure drop across the primary filtering region 44. The pressure drop in the sinus region may be typically increased from about 10 to about 100%. Because exhaled air follows a path of least resistance, it will have a greater tendency to pass through the mask body 12 at the primary filtering region 44, rather than through the sinus region 40. There is accordingly less opportunity for a wearer's eyewear to become fogged by the exhalate that passes from the interior gas space to the exterior gas space. The intended pattern of spot welds 42 can be achieved by, for example, ultrasonic welding and or any other suitable technique (for example, adhesive bonding) for fusing or joining the individual layers together.

FIGS. 1, 4, and 5 further illustrate sinus region 40 of the mask body and its particular confines. In defining the sinus region, the apex 45 of the nose region is first located. The outer extremities of the sinus region are located by moving along the perimeter 21 of the mask body 12, 9 cm on each side of the apex 45, until points 47 are located. Thus, if a string were laid on the perimeter 21 such that it followed the perimeter until reaching point 47, the string would be 9 cm in length on each side of point 45 for a total length of 18 cm. A fourth point 49 is also located 5 cm away from the perimeter 21 along a line that bisects the mask body. The sinus region is the surface area of the mask body that is located between the perimeter 21 and the straight lines that connect points 47 and point 49. The area that may be intrinsically altered may comprise about 1 to 100% of the total surface area of the sinus region, typically about 2 to 50% of the total surface area of the sinus region, more typically about 6 to 10% of the total surface area of the sinus region. The alteration to the intrinsic structure of the sinus region does not need to extend fully across the sinus region in the crosswise dimension but preferably extends over much of the nose region and preferably at least partially beneath each of the wearer's eyes (eye region). Only parts of the sinus region may need to be altered to achieve a significant increase in pressure drop. The alteration of the intrinsic structure of the mask body also may occur beyond the sinus region although such may not be desired because it would reduce the surface area available for filtering and could increase total pressure drop across the mask body.

Figure 8:
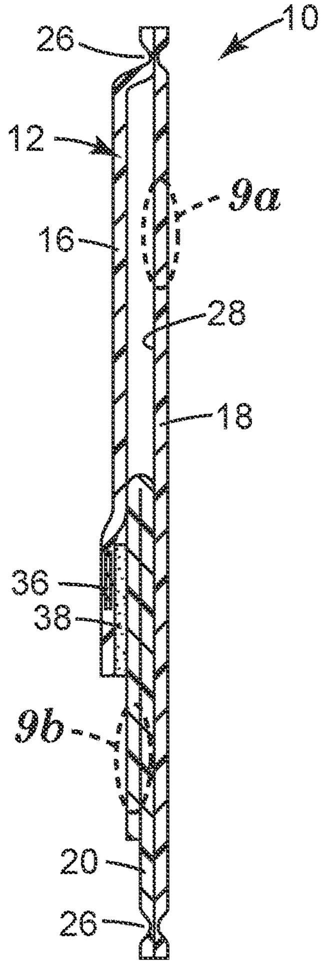
FIG. 8 is a cross-section of the maintenance-free respirator 10 taken along lines 8-8 of FIG. 7.

FIG. 8 is a cross-sectional view that shows the mask body in folded condition. As illustrated, the top end bottom panel 16 and 20 can be folded about the bond, seam, weld, and/or fold lines 24 and 26 towards the inner surface 28 of the central panel 18. The lower panel 20 may further be folded upon itself so that it can be easily grasped for opening purposes. Each of the panels may be structurally different as described below with reference to the magnified areas 9*a* and 9*b*.

Figure 9A:
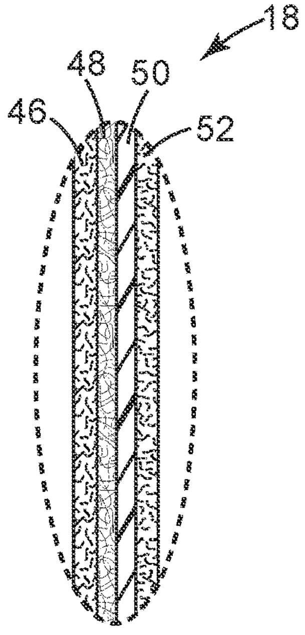
FIGS. 9*a* and 9*b* show enlarged cross-sections of the central and upper panels 18 and 16 taken from regions 9*a* and 9*b*, respectively, of FIG. 8.
Figure 9B:
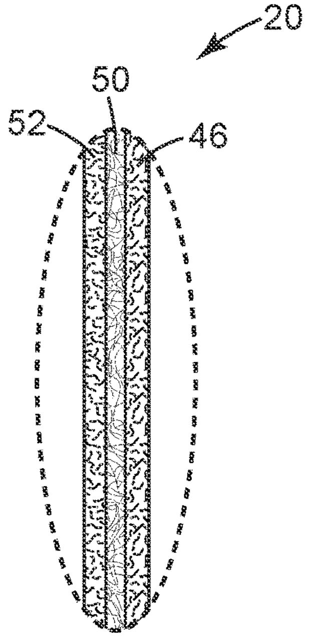
Figure 10A:
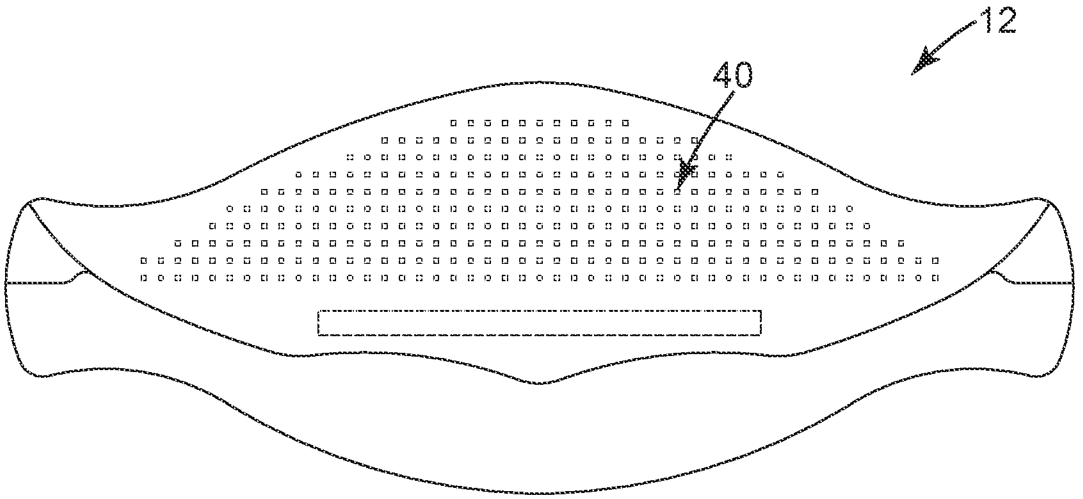
FIGS. 10*a*-10*d* illustrate various welding patterns that could be used in the sinus region 40 of the mask body 12 in accordance with the present invention.
Figure 10B:
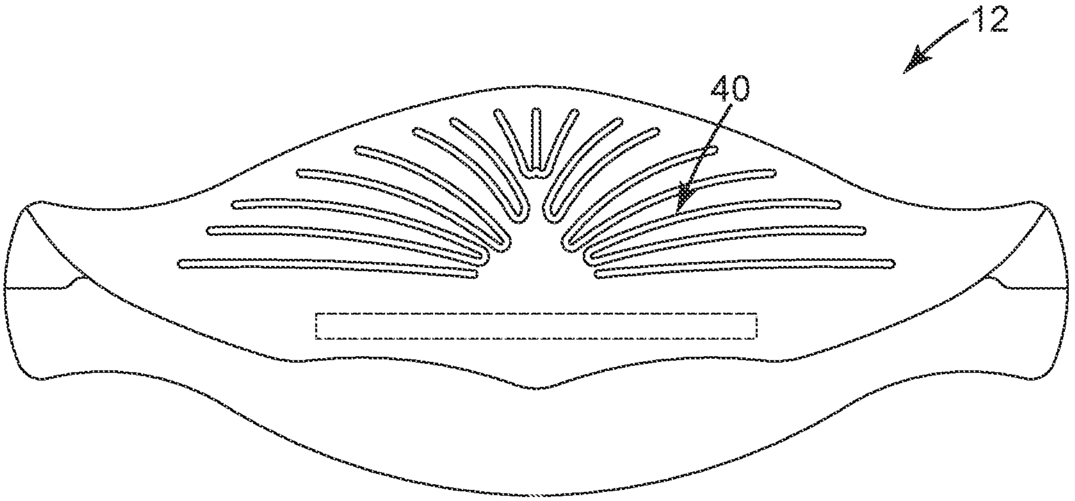
Figure 10C:
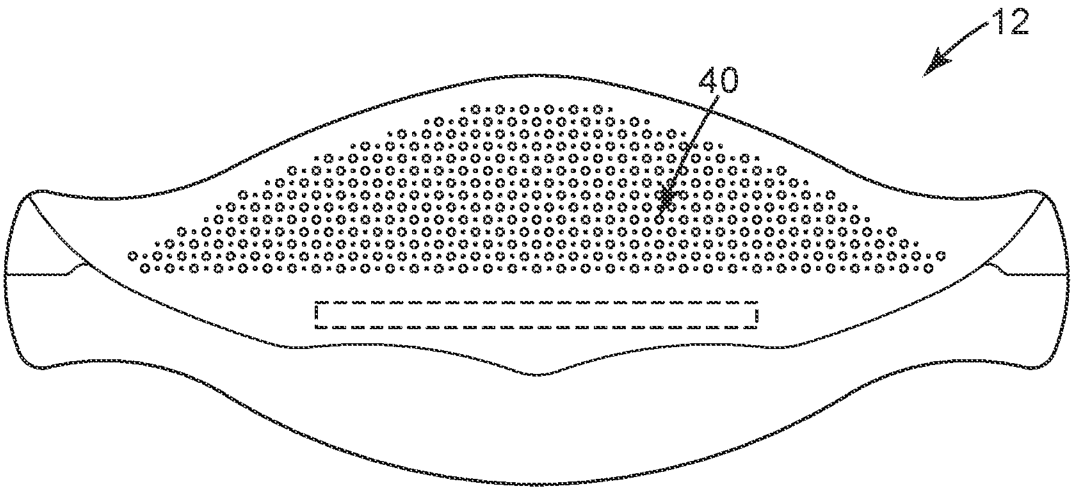
Figure 10D:
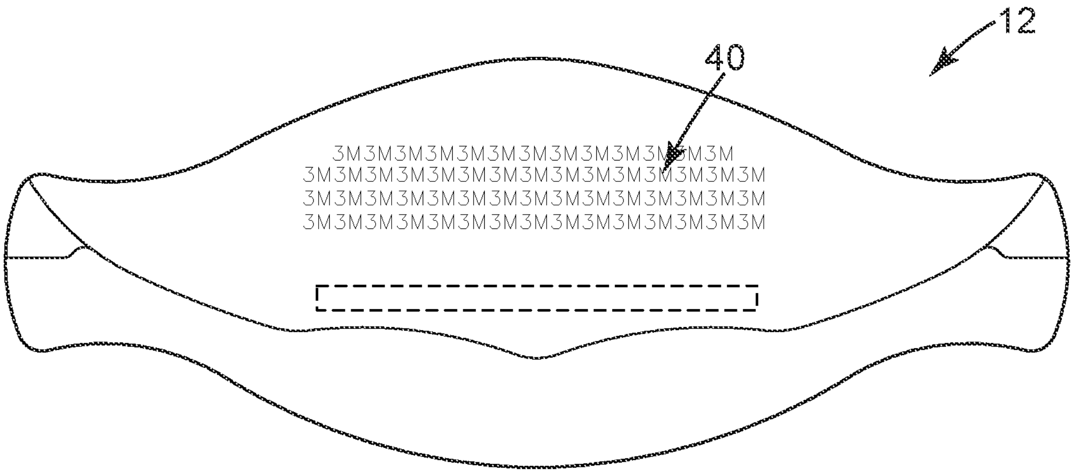

As shown in FIGS. 9*a* and 9*b*, the mask body may comprise a plurality of layers, including an inner cover web 46, a stiffening layer 48, a filtration layer 50, and an outer cover web 52. The layers may be joined together at the perimeter of the panels using various techniques, including adhesive bonding and ultrasonic welding. Examples of perimeter bond patterns are shown in U.S. Pat. D416,323 to Henderson et al. Descriptions of these various layers and how they may be constructed are set forth below FIGS. 10*a* to 10*d* show various patterns that can be placed onto the sinus region. The patterns can be welded into the sinus region of the mask body and may comprise a repeating series of spot welds of the same or different sizes, a trademark or series of repeating trademarks. The pattern also could be a design that is symmetrical about a plane that bisects the mask body.

Stiffening Layer

The mask body optionally may include a stiffening layer in one or more of the mask panels. The purpose of the stiffening layer is, as its name implies, to increase the stiffness of the panel(s) relative to other panel(s) or parts of the mask body. The stiffening layer may help support the mask body off of the wearer's face. The stiffening layer may be located in any combination of the panels but is preferably located in the central panel of the mask body. Giving support to the center of the mask body helps prevent it from collapse onto the nose and mouth of the wearer while leaving the top and bottom panels relatively compliant to aid sealing to the user's face. The stiffening layer may be positioned at any point within the layered construction of the panel(s) and most typically is located on or near the outer cover web.

The stiffening layer can be formed from any number of web based materials. These materials may include open mesh-like structures made of any number of commonly available polymers including polypropylene, polyethylene, and the like. The stiffening layer also could be derived from a spun bond web based material, again made from either polypropylene or polyethylene. The distinguishing property of the stiffening layer is that its stiffness, relative to the other layers within the mask body, is greater.

Filtration Layer

Filter layers used in a mask body of the invention can be of a particle capture or gas and vapor type. The filter layer also may include a barrier layer that prevents the transfer of liquid from one side of the filter layer to another to prevent, for instance, liquid aerosols or liquid splashes from penetrating the filter layer. Multiple layers of similar or dissimilar filter types also may be used to construct the filtration layer of the invention depending on the particular application. Filters beneficially employed in a layered mask body of the invention are generally low in pressure drop (for example, less than about 20 to 30 mm $H_2O$ at a face velocity of 13.8 centimeters per second) to minimize the breathing work of the mask wearer. Filtration layers additionally are flexible and have sufficient shear strength so that they do not delaminate under the expected use conditions. Generally the shear strength is less than that of either the adhesive or shaping layers. Examples of particle capture filters include one or more webs of fine inorganic fibers (such as fiberglass) or polymeric synthetic fibers. Synthetic fiber webs may include electret charged polymeric microfibers that are produced from processes such as meltblowing. Polyolefin microfibers formed from polypropylene that are electret charged, to produce non-polarized trapped charges, provide particular utility for particulate capture applications. The filter layer also may comprise a sorbent component for removing hazardous or odorous gases from the breathing air. Sorbents may include powders or granules that are bound in a filter layer by adhesives, binders, or fibrous structures—see U.S. Pat. No. 3,971,373 to Braun. A sorbent layer can be formed by coating a substrate, such as fibrous or reticulated foam, to form a thin coherent layer. Sorbent materials such as activated carbons, that are chemically treated or not, porous alumna-silica catalyst substrates, and alumna particles, are examples of sorbents that are useful in applications of the invention.

The filtration layer is typically chosen to achieve a desired filtering effect and, generally, removes a high percentage of particles or other contaminants from the gaseous stream that passes through it. For fibrous filter layers, the fibers selected depend upon the kind of substance to be filtered and, typically, are chosen so that they do not become bonded together during the molding operation. As indicated, the filter layer may come in a variety of shapes and forms. It typically has a thickness of about 0.2 millimeters to 1 centimeter, more typically about 0.3 millimeters to 0.5 centimeter, and it could be a planar web coextensive with a shaping or stiffening layer, or it could be a corrugated web that has an expanded surface area relative to the shaping layer—see, for example, U.S. Pat. Nos. 5,804,295 and 5,656,368 to Braun et al. The filtration layer also may include multiple layers of filter media joined together by an adhesive component. Essentially any suitable material that is known for forming a filtering layer of a direct-molded respiratory mask may be used for the mask filtering material. Webs of melt-blown fibers, such as those described in Wente, Van A., *Superfine Thermoplastic Fibers,* 48 Indus. Engn. Chem., 1342 et seq. (1956), especially when in a persistent electrically charged (electret) form, are especially useful (see, for example, U.S. Pat. No. 4,215,682 to Kubik et al.). These melt-blown fibers may be microfibers that have an effective fiber diameter less than about 20 micrometers (lam) (referred to as BMF for "blown microfiber"), typically about 1 to 12 μm. Effective fiber diameter may be determined according to Davies, C. N., *The Separation Of Airborne Dust Particles*, Institution Of Mechanical Engineers, London, Proceedings 1B, 1952. Particularly preferred are BMF webs that contain fibers formed from polypropylene, poly(4-methyl-1-pentene), or combinations thereof. Electrically charged fibrillated-film fibers as taught in van Turnhout, U.S. patent Re. 31,285, may also be suitable, as well as rosin-wool fibrous webs and webs of glass fibers or solution-blown, or electrostatically sprayed fibers, especially in microfilm form. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. Nos. 6,454,986 and 6,406,657 to Eitzman et al., and U.S. Pat. Nos. 6,375,886 and 5,496,507 to Angadjivand et al. Electric charge also may be impacted to the fibers by corona charging as disclosed in U.S. Pat. No. 4,588,537 to Klasse et al. or tribocharging as disclosed in U.S. Pat. No. 4,798,850 to Brown. Also, additives can be included in the fibers to enhance the filtration performance of webs produced through the hydro-charging process (see U.S. Pat. No. 5,908,598 to Rousseau et al.). Fluorine atoms, in particular, can be disposed at the surface of the fibers in the filter layer to improve filtration performance in an oily mist environment—see U.S. Pat. Nos. 6,398,847 B1, 6,397,458 B1, and 6,409,806 B1 to Jones et al. Typical basis weights for electret BMF filtration layers are about 15 to 100 grams per square meter. When electrically charged according to techniques described in, for example, the '507 patent, the basis weight may be about 20 to 40 g/m$^2$ and about 10 to 30 g/m$^2$, respectively.

Cover Web

An inner cover web could be used to provide a smooth surface that contacts the wearer's face, and an outer cover web could be used to entrap loose fibers in the outer shaping layer or for aesthetic reasons. A cover web typically does not provide any significant shape retention to the mask body. To obtain a suitable degree of comfort, an inner cover web typically has a comparatively low basis weight and is formed from comparatively fine fibers. More particularly, the cover web has a basis weight of about 5 to 50 g/m$^2$ (typically 10 to 30 g/m$^2$), and the fibers are less than 3.5 denier (typically less than 2 denier, and more typically less than 1 denier). Fibers used in the cover web often have an average fiber diameter of about 5 to 24 micrometers, typically of about 7 to 18 micrometers, and more typically of about 8 to 12 micrometers.

The cover web material may be suitable for use in the molding procedure by which the mask body is formed, and to that end, advantageously, has a degree of elasticity (typically, but not essentially, 100 to 200% at break) or is plastically deformable.

Suitable materials for the cover web may include blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum.

A typical cover web may be made from polypropylene or a polypropylene/polyolefin blend that contains 50 weight percent or more polypropylene. These materials have been found to offer high degrees of softness and comfort to the wearer and also—when the filter material is a polypropylene BMF material—to remain secured to the filter material after the molding operation without requiring an adhesive between the layers. Typical materials for the cover web are polyolefin BMF materials that have a basis weight of about 15 to 35 grams per square meter (g/m$^2$) and a fiber denier of about 0.1 to 3.5, and are made by a process similar to that described in the '816 patent. Polyolefin materials that are suitable for use in a cover web may include, for example, a single polypropylene, blends of two polypropylenes, blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation and having a basis weight of about 25 g/m$^2$ and a fiber denier in the range 0.2 to 3.1 (with an average, measured over 100 fibers of about 0.8). Another suitable fiber is a polypropylene/polyethylene BMF (produced from a mixture comprising 85 percent of the resin "Escorene 3505G" and 15 percent of the ethylene/alpha-olefin copolymer "Exact 4023" also from Exxon Corporation) having a basis weight 25 g/m$^2$ and an average fiber denier of about 0.8. Other suitable materials may include spunbond materials available, under the trade designations "Corosoft Plus 20", "Corosoft Classic 20" and "Corovin PP-S-14", from Corovin GmbH of Peine, Germany, and a carded polypropylene/viscose material available, under the trade designation "370/15", from J. W. Suominen OY of Nakila, Finland.

Cover webs that are used in the invention typically have very few fibers protruding from the surface of the web after processing and therefore have a smooth outer surface. Examples of cover webs that may be used in the present invention are disclosed, for example, in U.S. Pat. No. 6,041,782 to Angadjivand, U.S. Pat. No. 6,123,077 to Bostock et al., and WO 96/28216A to Bostock et al.

Shaping Layer

If the mask body takes on a molded cup-shaped configuration, rather than the illustrated flat-fold configuration, the mask body may comprise a shaping layer that supports a filtration layer on its inner or outer sides. A second shaping layer that has the same general shape as the first shaping layer also could be used on each side of the filtration layer. The shaping layer's function is primarily to maintain the shape of the mask body and to support the filtration layer. Although an outer shaping layer also may function as a coarse initial filter for air that is drawn into the mask, the predominant filtering action of the respirator is provided by the filter media.

The shaping layers may be formed from at least one layer of fibrous material that can be molded to the desired shape with the use of heat and that retains its shape when cooled. Shape retention is typically achieved by causing the fibers to bond to each other at points of contact between them, for example, by fusion or welding. Any suitable material known for making a shape-retaining layer of a direct-molded respiratory mask may be used to form the mask shell, including, for example, a mixture of synthetic staple fiber, preferably crimped, and bicomponent staple fiber. Bicomponent fiber is a fiber that includes two or more distinct regions of fibrous material, typically distinct regions of polymeric materials. Typical bicomponent fibers include a binder component and a structural component. The binder component allows the fibers of the shape-retaining shell to be bonded together at fiber intersection points when heated and cooled. During heating, the binder component flows into contact with adjacent fibers. The shape-retaining layer can be prepared from fiber mixtures that include staple fiber and bicomponent fiber in a weight-percent ratios that may range, for example, from 0/100 to about 75/25. Typically, the material includes at least 50 weight-percent bicomponent fiber to create a greater number of intersection bonding points, which, in turn, increase the resilience and shape retention of the shell.

Suitable bicomponent fibers that may be used in the shaping layer include, for example, side-by-side configurations, concentric sheath-core configurations, and elliptical sheath-core configurations. One suitable bicomponent fiber is a polyester bicomponent fiber available, under the trade designation "KOSA T254" (12 denier, length 38 mm), from Kosa of Charlotte, North Carolina, U.S.A., which may be used in combination with a polyester staple fiber, for example, that available from Kosa under the trade designation "T259" (3 denier, length 38 mm) and possibly also a polyethylene terephthalate (PET) fiber, for example, that available from Kosa under the trade designation "T295" (15 denier, length 32 mm). The bicomponent fiber also may comprise a generally concentric sheath-core configuration having a core of crystalline PET surrounded by a sheath of a polymer formed from isophthalate and terephthalate ester monomers. The latter polymer is heat softenable at a temperature lower than the core material. Polyester has advantages in that it can contribute to mask resiliency and can absorb less moisture than other fibers.

The shaping layer also can be prepared without bicomponent fibers. For example, fibers of a heat-flowable polyester can be included together with staple, preferably crimped, fibers in a shaping layer so that, upon heating of the web material, the binder fibers can melt and flow to a fiber intersection point where it forms a mass, that upon cooling of the binder material, creates a bond at the intersection point. A mesh or net of polymeric strands also could be used in lieu of thermally bondable fibers. An example of this type of a structure is described in U.S. Pat. No. 4,850,347 to Skov.

When a fibrous web is used as the material for the shape-retaining shell, the web can be conveniently prepared on a "Rando Webber" air-laying machine (available from Rando Machine Corporation, Macedon, New York) or a carding machine. The web can be formed from bicomponent fibers or other fibers in conventional staple lengths suitable for such equipment. To obtain a shape-retaining layer that has the required resiliency and shape-retention, the layer typically has a basis weight of at least about 100 g/m$^2$, although lower basis weights are possible. Higher basis weights, for example, approximately 150 or more than 200 g/m$^2$, may provide greater resistance to deformation. Together with these minimum basis weights, the shaping layer typically has a maximum density of about 0.2 g/cm$^2$ over the central area of the mask. Typically, the shaping layer has a thickness of about 0.3 to 2.0 millimeters (mm), more typically about 0.4 to 0.8 mm. Examples of molded maintenance-free respirators that use shaping layers are described in U.S. Pat. No. 7,131,442 to Kronzer et al., U.S. Pat. No. 6,293,182 to Angadjivand et al., U.S. Pat. No. 4,850,347 to Skov; U.S. Pat. No. 4,807,619 to Dyrud et al., and U.S. Pat. No. 4,536,440 to Berg.

Molded maintenance-free respirators may also be made without using a separate shaping layer to support the filtration layer. In these respirators, the filtration layer also acts as the shaping layer—see U.S. Pat. No. 6,827,764 to Springett et al. and U.S. Pat. No. 6,057,256 to Krueger et al.

The respirator also may include an optional exhalation valve that allows for the easy displacement of air exhaled by the user. Exhalation valves that exhibit an extraordinary low pressure drop during an exhalation are described in U.S. Pat. Nos. 7,188,622, 7,028,689, and 7,013,895 to Martin et al.; 7,117,868, 6,854,463, 6,843,248, and 5,325,892 to Japuntich et al.; and U.S. Pat. No. 6,883,518 to Mittelstadt et al. The exhalation valve is preferably secured to the central panel, preferably near the middle of the central panel, by a variety of means including sonic welds, adhesive bonding, mechanical clamping, and the like—see, for example, U.S. Pat. Nos. 7,069,931, 7,007,695, 6,959,709, and 6,604,524 to Curran et al and EP1,030,721 to Williams et al.

Pressure Drop Test

The purpose of the test is to measure the pressure drop difference between an altered sinus region and an unaltered sinus region and an altered sinus regions and the primary filtering region of a maintenance free respirator mask body.

To measure these differences in pressure drop, 40 mm diameter circular samples were taken from both the sinus region and the primary filtering region. These circular samples were cut out using a die cut tool.

To carry out the pressure drop measurements, the 40 mm diameter circular samples were independently secured under a pneumatic load using a mechanical chuck that was connected to an airflow rig that simulated various flow rates. This airflow rig is described in detail in EN149:2001, section 7.16 (breathing resistance test method).

The sample being measured was placed in the chuck and was clamped thereto. An enclosed airspace was provided on each side of the sample. The first airspace was provided with an input for receiving air flow, and the second airspace had an exit tube that communicated with the ambient airspace to allow air to escape. Probes were located on each side of the material to measure the pressure. The difference in pressure (pressure drop) was determined through use of a digital manometer that was connected to the probes.

Air was supplied at a flow rate of 25 liters per minute (Ipm) to the first airspace.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Example 1

A 3M model 9322 maintenance-free respirator, available from the 3M Company, St. Paul, Minnesota, was modified to create a bond pattern in the sinus region that resembled the pattern shown in FIGS. 1-7. This respirator had a total sinus area of about 4,750 square mm. The bond pattern was created as follows:

The bond pattern was applied utilizing an ultrasonic welding plunge press that had a patterned anvil. The sinus region panel construction was located across the patterned anvil and was held in place using six locating dowels. The plunge press was then actuated, and the welding horn was lowered to compact the sinus region panel between the anvil and the horn. In this manner, the bond pattern was applied to the sinus region. The welding cycle was controlled by setting the weld time to 400 milliseconds (ms) to optimize the resulting bond pattern in the sinus region. Three percent (3%) of the total sinus region available to be bonded had its intrinsic structure altered by ultrasonic welding.

Examples 2-3

These examples were prepared as described above in Example 1 but the percent of the total area subjected to actual welding was increased such that Example 2 was welded at 5% of the total available surface area, and Example 3 was welded at 9% of such area.

Example 1C

An unmodified 3M model 9322 respirator was used.

Examples 1-3 and 1C were subjected to the Pressure Drop Test set forth above. The results are shown below in Table 1.

TABLE 1

| Sample | Example (Sinus Region) | | | | Primary Filtering Region 3M Brand 9322 |
|---|---|---|---|---|---|
| Measured | 1C | 1 | 2 | 3 | Respirator |
| Pressure Drop (mmH20) | 14.9 | 19.9 | 22.5 | 29.4 | 26.2 |

The data set forth in Table 1 demonstrates that the pressure drop across the sinus region increases when the intrinsic structure of the mask body is altered there. The example 1C (unmodified sinus region) exhibited a pressure drop reading of 14.9 mmH20. This value increased as the bond pattern coverage area increased. In Example 3 the pressure drop increased across the sinus region to the extent the pressure drop of the sinus region was greater than the primary filtering region. The increase in pressure drop encourages the exhaled air to pass through the primary filtering region and accordingly may reduce the amount of eyewear lens fog.

This invention may take on various modifications and alterations without departing from the spirit and scope thereof. Accordingly, it is to be understood that this invention is not to be limited to the above-described, but it is to be controlled by the limitations set forth in the following claims and any equivalents thereof.

It is also to be understood that this invention may be suitably practiced in the absence of any element not specifically disclosed herein.

All patents and patent applications cited above, including those in the Background section, are incorporated by reference into this document in total. To the extent that there is a conflict in disclosure between the present document and any document incorporated by reference, the present document will control.

What is claimed is:

1. A respirator comprising:

a mask body, wherein the mask body comprises:

a plurality of layers joined together at a perimeter of the mask body, wherein the plurality of layers comprises a cover web and a filtration layer;

a sinus region; and a primary filtering region;

wherein at least a portion of the sinus region comprises an alteration to its intrinsic structure to significantly increase the pressure drop across the sinus region, wherein the increase in pressure drop is achieved by the alteration of the intrinsic structure of the sinus region, and wherein the alteration of the intrinsic structure does not occur substantially outside the sinus region.

2. The respirator of claim 1, wherein the sinus region comprises:

a nose region that resides over a person's nose when the respirator is worn; and areas of the mask body that reside beneath at least one of the person's eyes or eye orbitals when the respirator is being worn.

3. The respirator of claim 1, wherein the cover web of the plurality of layers of the mask body comprises an inner cover web, wherein the plurality of layers further comprises an outer cover web, wherein the filtration layer is disposed between the inner cover web and the outer cover web.

4. The respirator of claim 3, wherein the plurality of layers of the mask body further comprises a stiffening layer.

5. The respirator of claim 3, wherein the stiffening layer is disposed in the filtering region of the mask body.

6. The respirator of claim 3, wherein the stiffening layer comprises a polymer material.

7. The respirator of claim 1, wherein the plurality of layers of the mask body are ultrasonically welded together at the perimeter of the mask body.

8. The respirator of claim 1, wherein the mask body further comprises an upper panel, a central panel, and a lower panel, wherein the central panel is separated from the upper panel by a first line of demarcation and the lower panel by a second line of demarcation, wherein the sinus region is located on the upper panel.

9. The respirator of claim 8, wherein the upper panel comprises a nose clip.

10. The respirator of claim 8, further comprising a nose foam disposed inwardly along an inside perimeter of the upper panel or around the entire perimeter of the mask body.

11. The respirator of claim 8, further comprising an exhalation valve secured to the central panel of the mask body.

12. The respirator of claim 1, wherein the increase in pressure drop is achieved without adding additional material or items to the sinus region.

13. The respirator of claim 1, wherein the alteration of the intrinsic structure comprises a series of spot welds.

14. The respirator of claim 1, wherein the alteration of the intrinsic structure occurs over 1 to 100% of the total surface area of the sinus region.

15. The respirator of claim 1, wherein the intrinsic structure of the mask body is altered by bonding the plurality of layers together to form the alteration to its intrinsic structure.

16. A mask body comprising:

a plurality of layers joined together at a perimeter of the mask body, wherein the plurality of layers comprises a cover web and a filtration layer;

a sinus region; and a primary filtering region;

wherein at least a portion of the sinus region comprises an alteration to its intrinsic structure to significantly increase the pressure drop across the sinus region, wherein the increase in pressure drop is achieved by the alteration of the intrinsic structure of the sinus region, and wherein the alteration of the intrinsic structure does not occur substantially outside the sinus region.

17. The mask body of claim 16, wherein the increase in pressure drop is achieved without adding additional material or items to the sinus region.

18. The mask body of claim 16, wherein the alteration of the intrinsic structure comprises a series of spot welds.

19. The respirator of claim 16, wherein the sinus region comprises:

a nose region that resides over a person's nose when the respirator is worn; and areas of the mask body that reside beneath at least one of the person's eyes or eye orbitals when the respirator is being worn.

20. The respirator of claim 16, wherein the cover web of the plurality of layers of the mask body comprises an inner cover web, wherein the plurality of layers further comprises an outer cover web, wherein the filtration layer is disposed between the inner cover web and the outer cover web.

* * * * *